3,061,993
GAS PURIFYING APPARATUS
Karl Axel Göran Gustavsson, Enköping, Sweden, assignor to Aktiebolaget Bahco, Stockholm, Sweden, a corporation of Sweden
Filed June 7, 1960, Ser. No. 34,514
Claims priority, application Sweden June 17, 1959
1 Claim. (Cl. 55—248)

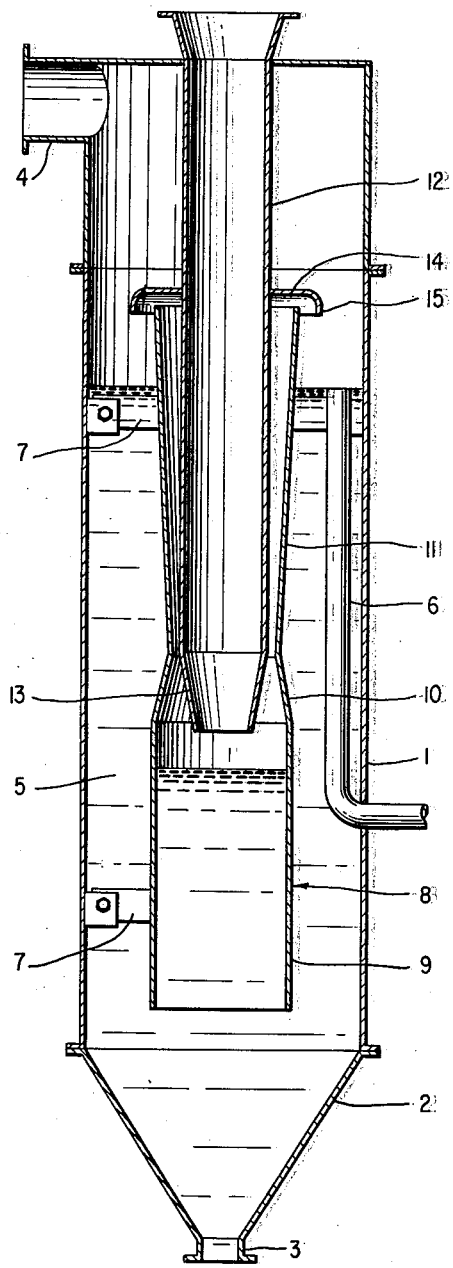

The present invention relates to a gas purifying apparatus of the type in which a flow of dust-containing gas is directed substantially normal to the surface of a pool of liquid and entrains liquid droplets from the liquid and then carries these droplets with it while flowing in a substantially normal direction away from the liquid surface, during which flow the liquid droplets take up dust from the gas, whereupon the gas flow is subjected to a deflection such that the liquid droplets are separated from the gas and return to the pool of liquid while the gas flows substantially free from liquid droplets to an outlet.

In order to achieve this function an apparatus of such type comprises a chamber adapted to accommodate a pool of liquid of substantially constant level, an upwardly and downwardly open, essentially cylindrical jacket provided in said chamber partly immersed in the pool of liquid and extending substantially normal to the surface of the pool of liquid, said jacket being spaced from the chamber wall, a gas inlet tube extending into the jacket substantially coaxially therewith and terminating above the liquid level within the jacket, a deflection plate disposed above the upper end of the jacket and spaced therefrom, said deflection plate extending radially beyond the jacket and sealingly engaging the gas inlet tube, and a gas outlet provided on the chamber above the level of the deflection plate, the lengths of the jacket and gas inlet tube being such that they define an annular space, the height of which is at least equal to the diameter of the jacket, said space being unobstructed.

The main object of the present invention is to improve the contact between the liquid droplets and the gas during the flow away from the liquid surface in order to enhance the dust separating capacity.

In accordance with this invention, this object is achieved thereby that the jacket and/or the gas inlet tube are so constructed that the annular space defined by them at a level above the mouth of the gas inlet tube has an upwardly converging portion followed by an upwardly diverging portion, whereby an acceleration of the gas velocity is achieved in the converging portion.

An embodiment of the invention is illustrated in cross-section on the accompanying drawing.

Referring to the drawing, the apparatus comprises a cylindrical casing 1 having a conical bottom section 2 with a liquid outlet 3 and provided adjacent its top with a laterally directed gas outlet 4. The casing 1 defines a chamber which is adapted to accommodate a liquid pool 5 the level of which is determined by an overflow outlet 6. Attached to the casing 1 by means of arms 7 is a vertical jacket 8, the lower portion 9 of which is cylindrical and which comprises above the cylindrical portion 9 an upwardly conically tapering portion 10 and there above a portion 11, which diverges conically upwardly to a diameter substantially equal to that of the cylindrical portion 9, the portion 11 extending above the liquid level determined by the overflow outlet 6. Coaxial with the jacket 8 is a gas inlet tube 12, which along the major portion of its extension is cylindrical, but the lowest portion of which, at a level with the portion 10 of the jacket tapers conically downwardly. Attached around the tube 12 and spaced a short distance from the upper end of the jacket 8 is a deflection plate 14 which extends radially beyond the jacket and has a downturned annular skirt 15.

In operation, a dust-containing gas to be purified flows through tube 12 toward the liquid surface. Thereby, the liquid within the jacket 8 will be forced down to a level below the mouth of the gas outlet tube 12, as shown on the drawing. Thus, the gas flows normally to the liquid surface and is deflected to flow in a normal direction away from the liquid surface through the space between the jacket 8 and the gas inlet tube 12. The gas picks up liquid droplets from the liquid, which accompany the gas and take up dust therefrom. In the narrowing passage between the jacket portion 10 and the mouth portion 13 of the gas inlet tube, the gas obtains an increase in velocity which improves the contact between the liquid and the gas and thereby intensifies the absorption of dust. The mixture of liquid droplets and gas continues with decreasing velocity through the diverging portion 11, whereupon it is compelled by the deflection plate 14 and its downturned skirt 15 to undergo abrupt changes in direction before the gas leaves through outlet 4. These changes in direction cause the dust-containing liquid droplets to be separated from the gas and to fall outside the jacket 8 into the liquid pool 5 wherein the dust settles toward the bottom. The resulting sludge can be removed by withdrawing liquid through outlet 3.

If desired, the overflow outlet 6 can be made adjustable so that the level of the liquid pool 5 can be controlled, whereby the function of the apparatus can be controlled to some extent.

The invention is not limited to the embodiment shown and described, which can be varied in many ways within the scope of the invention.

I claim:

An apparatus for purifying a gas, comprising a chamber adapted to accommodate a pool of liquid of substantially constant level, an upwardly and downwardly open, essentially cylindrical jacket provided in said chamber partly immersed in the pool of liquid and extending substantially normal to the surface of the pool of liquid, said jacket being spaced throughout its length from the chamber wall, a gas inlet tube extending into the jacket substantially coaxially therewith and terminating above the liquid level within the jacket, a deflection plate disposed above the upper end of the jacket and spaced therefrom, said deflection plate sealingly engaging the gas inlet tube at an angle of no more than 90° with the lower end of said tube and extending outwardly beyond said jacket to terminate in an outer, downturned edge so that liquid droplets deposited on said plate will drip from the outer edge thereof to the pool outside said jacket, a gas outlet provided on the chamber above the level of the deflection plate, said jacket and gas inlet tube being of such lengths as to define an unobstructed annular space whose height is at least equal to the diameter of the jacket, and at least one of said jacket and gas inlet tube being formed with tapering portions so that said annular space between them at a level above the lower end of the gas inlet tube has an upwardly converging portion defining a venturi passage followed by an upwardly diverging portion, whereby an acceleration of the gas velocity is achieved in the converging portion.

References Cited in the file of this patent

UNITED STATES PATENTS

| 1,049,988 | Briede | Jan. 7, 1913 |
| 1,411,950 | Wyatt | Apr. 4, 1922 |
| 2,721,065 | Ingram | Oct. 18, 1955 |

FOREIGN PATENTS

| 574,591 | Great Britain | Jan. 11, 1946 |
| 624,542 | France | Nov. 13, 1926 |
| 972,746 | France | Sept. 6, 1950 |